US012602314B2

(12) United States Patent
Sun et al.

(10) Patent No.: US 12,602,314 B2
(45) Date of Patent: Apr. 14, 2026

(54) MEMORY TOPOLOGY BASED EXPANSION METHOD AND RELATED DEVICE

(71) Applicant: HUAWEI TECHNOLOGIES CO., LTD., Guangdong (CN)

(72) Inventors: Hongwei Sun, Beijing (CN); Guangcheng Li, Beijing (CN); Peifeng Qin, Shenzhen (CN); Xiaoming Bao, Beijing (CN); Jun You, Chengdu (CN); Xiuqiao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/473,314

(22) Filed: Sep. 25, 2023

(65) Prior Publication Data

US 2024/0012750 A1     Jan. 11, 2024

Related U.S. Application Data

(63) Continuation of application No. PCT/CN2022/084365, filed on Mar. 31, 2022.

(30) Foreign Application Priority Data

Apr. 8, 2021     (CN) .......................... 202110378601.6
Jul. 20, 2021     (CN) .......................... 202110821704.5

(51) Int. Cl.
*G06F 12/02*     (2006.01)

(52) U.S. Cl.
CPC .... *G06F 12/023* (2013.01); *G06F 2212/1024* (2013.01); *G06F 2212/154* (2013.01)

(58) Field of Classification Search
CPC .............. G06F 12/023; G06F 12/0284; G06F 2212/154; G06F 9/5077; G06F 2209/5011
See application file for complete search history.

(56) References Cited

U.S. PATENT DOCUMENTS 8,082,400 B1 * 12/2011 Chang ................... G06F 9/5077
                                                          709/215
9,619,429 B1     4/2017 Wang et al.
                    (Continued)

FOREIGN PATENT DOCUMENTS

CN     103353861 A     10/2013
CN     105701019 A     6/2016
                    (Continued)

OTHER PUBLICATIONS

Yu Zhiguo:"Research on data center memory scalable technology",(Jul. 2, 2018), total 6 pages.

*Primary Examiner* — Nicholas A. Paperno

(57) ABSTRACT

In a memory expansion method, a first network device generates a memory topology based on memory requirement information of a target application and usage of a memory resource in a first memory pool, wherein the first memory pool is a logical memory comprising memory resources provided by a plurality of network devices, and the memory topology indicates capacities of different types of memory resources in one or more network devices that need to be occupied by the target application. The network device then establishes a second memory pool in the first memory pool based on the memory topology, wherein the second memory pool comprises a memory resource that is allowed to be used by the target application.

14 Claims, 4 Drawing Sheets

(56)         References Cited

U.S. PATENT DOCUMENTS

| | | | |
|---|---|---|---|
| 2003/0120780 A1 | 6/2003 | Zhu et al. | |
| 2013/0067188 A1* | 3/2013 | Mehra ................... | G06F 3/0689 |
| | | | 711/170 |
| 2015/0294113 A1* | 10/2015 | Troeger ............... | G06F 21/566 |
| | | | 726/25 |
| 2016/0070598 A1 | 3/2016 | Vadkerti et al. | |
| 2018/0027093 A1* | 1/2018 | Guim Bernat ...... | H04L 43/0876 |
| | | | 709/221 |
| 2018/0081559 A1 | 3/2018 | Stabrawa et al. | |
| 2018/0232395 A1* | 8/2018 | Deshmukh ............ | G06F 3/0643 |
| 2020/0396288 A1* | 12/2020 | Zhang ................... | G06F 3/0638 |
| 2021/0064438 A1 | 3/2021 | Zhou et al. | |

FOREIGN PATENT DOCUMENTS

| | | | |
|---|---|---|---|
| CN | 105867843 A | 8/2016 | |
| CN | 107045456 A | 8/2017 | |
| CN | 108287894 A | 7/2018 | |
| CN | 109144712 A | 1/2019 | |
| CN | 110955529 A | 4/2020 | |
| CN | 111324445 A | 6/2020 | |
| CN | 111338786 A | 6/2020 | |
| CN | 111367671 A | 7/2020 | |
| CN | 111581123 A | 8/2020 | |
| CN | 112114962 A | 12/2020 | |
| CN | 112181585 A | 1/2021 | |
| WO | 2016022925 A2 | 2/2016 | |

* cited by examiner

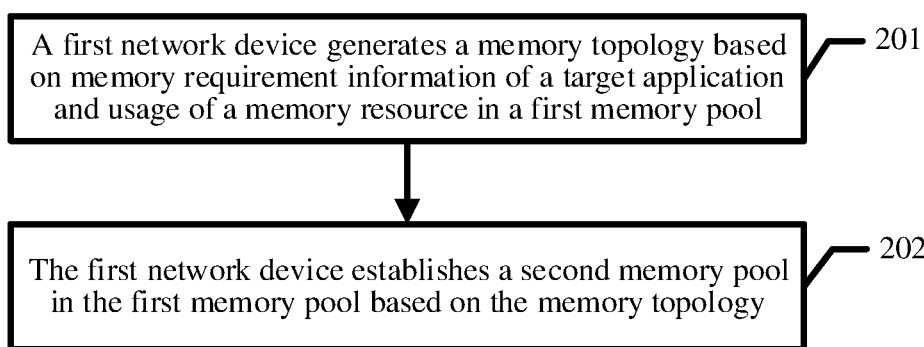

A first network device generates a memory topology based on memory requirement information of a target application and usage of a memory resource in a first memory pool — 201

The first network device establishes a second memory pool in the first memory pool based on the memory topology — 202

FIG. 2

|  | Double data rate dynamic random access memory (DDR) | Phase change memory (PCM) | Solid state disk (SSD) |
|---|---|---|---|
| Node 1 | 200 gigabytes (GB) | 500 GB | 1 terabyte TB |
| Node 2 | 250 GB | 800 GB | 500 GB |
| Node 3 | 5 GB | 500 GB | 800 GB |

FIG. 3

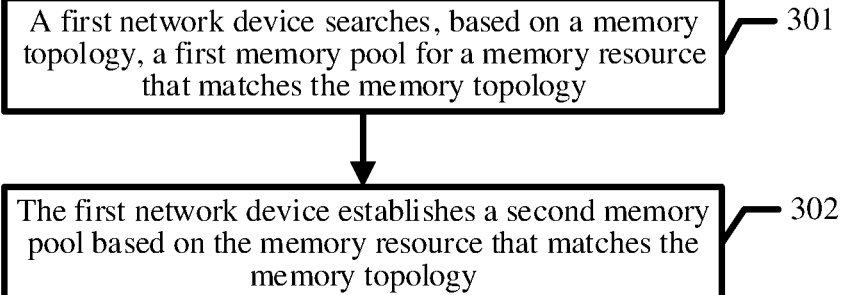

A first network device searches, based on a memory topology, a first memory pool for a memory resource that matches the memory topology — 301

The first network device establishes a second memory pool based on the memory resource that matches the memory topology — 302

FIG. 4

| Memory usage | Memory tiering suggestion | Node affinity |
|---|---|---|
| 5 terabytes (TB) | Double data rate dynamic random access memory (DDR): 1 TB; Phase change memory (PCM): 1 TB; Solid state disk (SSD): 2 TB | Centralized nodes (or scattered nodes) |

MEMORY TOPOLOGY BASED EXPANSION METHOD AND RELATED DEVICE

CROSS-REFERENCE TO RELATED APPLICATIONS

This application is a continuation of International Application PCT/CN2022/084365, filed on Mar. 31, 2022, which claims priority to Chinese Patent Application No. 202110821704.5, filed on Jul. 20, 2021 and Chinese Patent Application No. 202110378601.6, filed on Apr. 8, 2021. All of the aforementioned priority patent applications are hereby incorporated by reference in their entirety.

TECHNICAL FIELD

Embodiments of this application relate to the communication field, and in particular, to a memory expansion method and a related device.

BACKGROUND

Currently, computing power pooling and storage pooling are widely used as major infrastructure-level technologies. To improve application performance, memory pooling has attracted attention in the industry. In a conventional memory pooling solution, generally, from an architecture perspective, when a network device determines, by using a plurality of means, that a local memory is insufficient or data sharing and exchange is required, the network device may access a remote memory, to implement global memory sharing and pooling.

In the conventional pooling solution, remote memory sharing and pooling is implemented from the architecture perspective, and the essence of the solution is to expand the local memory of the network device, so that an efficient and transparent global memory pool service can be implemented for a network device that runs a standalone application. However, for a plurality of network devices that run a non-standalone application, in the conventional pooling solution, a quantity of network devices occupied after partitioning (SWAP) and a memory capacity occupied after partitioning cannot be effectively determined. A case in which an operation and calculation cannot be supported due to an excessively small memory obtained by the network device, leading to long waiting time for a cluster operation and low operation efficiency.

SUMMARY

This application provides a memory expansion method, a network device, and a communication system, so that service load distribution between memory pools can be dynamically adjusted, service load of the memory pools is appropriately distributed, waiting time for a cluster operation is reduced, and operation efficiency is improved.

A first aspect of this application provides a memory expansion method. The method includes: A first network device generates a memory topology based on memory requirement information of a target application and usage of a memory resource in a first memory pool, where the first memory pool is a logical memory including memory resources provided by a plurality of network devices, and the memory topology indicates capacities of different types of memory resources in one or more network devices that need to be occupied by the target application; and the first network device establishes a second memory pool in the first memory pool based on the memory topology, where the second memory pool indicates a memory resource that is allowed to be used by the target application.

In this application, the first network device may generate the memory topology based on the memory requirement information of the target application and the usage of the memory resource in the first memory pool, and then establish the second memory pool in the first memory pool based on the memory topology, where the second memory pool indicates the memory resource that is allowed to be used by the target application. In this way, the first network device can appropriately allocate a memory to the target application based on the memory requirement information and the usage of the resource in the first memory pool, and dynamically adjust service load distribution between the memory pools, so that service load of the memory pools is appropriately distributed, waiting time for a cluster operation is reduced, and operation efficiency is improved.

In a possible implementation of the first aspect, that the first network device establishes a second memory pool in the first memory pool based on the memory topology includes: The first network device determines, from the first memory pool based on the memory topology, a memory resource that matches the memory topology; and the first network device establishes the second memory pool based on the memory resource that matches the memory topology.

In the method, when a management node establishes the second memory pool, each first computing node selected based on memory topology information contributes some of memory resources (memory resources in a broad sense, including a plurality of media such as an HBM, a DDR, a PCM, and an SSD). The management node organizes all memory resources contributed by each first computing node into one global memory space (the second memory pool). In a first computing node, the management node may organize different media on the first computing node into a multi-layered memory structure, and the multi-layered memory structure becomes a part of the global memory space. In this possible implementation, a specific manner of establishing the second memory pool is provided, and implementability of the solution is improved.

In a possible implementation of the first aspect, the memory topology includes a quantity of network devices, a type of the memory resource, and a capacity of the memory resource.

In this possible implementation, a specific implementation of the memory topology is provided, and implementability of the solution is improved.

In a possible implementation of the first aspect, the second memory pool includes a high-performance memory segment, a low-performance memory segment, a persistence capability segment, and/or a non-persistence capability segment.

In this possible implementation, the management node may divide the global memory space into different memory segments, for example, the high-performance memory segment, the persistence capability segment, and the non-persistence capability segment, based on attributes of different media included in the memory pool, for example, a performance difference and whether there is a persistence capability. When addresses in these address segments are subsequently written, the addresses are written into corresponding media synchronously or asynchronously. In this possible implementation, the management node may store different data separately based on a plurality of factors such as use frequency and storage duration, so that the first network device completes an operation more efficiently.

In a possible implementation of the first aspect, the method further includes: The first network device receives data request information sent by a second network device, where the target application is run on the second network device, and the data request information is for requesting target data; and the first network device sends target address information to the second network device based on the data request information, where the target address information includes an address of a memory resource that stores the target data and that is in the second memory pool, and the target address information indicates the second network device to obtain the target data from the second memory pool by using memory semantics.

In this possible implementation, different processes of the target application are run on a plurality of second computing nodes, and the management node compiles the memory resource in the second memory pool in a unified addressing manner. Data exchange or data sharing may be performed, by using the memory semantics, between the second computing nodes that run the different processes in the second memory pool. Data exchange is performed between the second computing node and another second computing node in the second memory pool by using the memory semantics, to avoid a complex communication process, and greatly improve data exchange and data sharing efficiency.

In a possible implementation of the first aspect, the method further includes: The first network device generates the memory requirement information based on related information of the target application, where the related information of the target application includes a type of the target application, a memory expansion coefficient of the target application, an access characteristic of the target application, and/or an amount of input data of the target application, and the memory requirement information includes computing power, absolute memory usage, a memory tiering configuration, and/or a node affinity configuration of the target application.

In this possible implementation, the management node may include a memory computing unit. When the target application on the second computing node is started, the management node may evaluate the memory requirement information of the target application based on the related information of the target application by using the memory computing unit. The memory computing unit is application-aware, and the memory computing unit may obtain the related information of the target application in a plurality of manners, such as a program built-in manner, a user input manner, or a self-learning manner. After the memory computing unit obtains the related information of the target application, the memory computing unit may calculate, based on the type of the application, the amount of input data, the memory expansion coefficient of the application, and the memory access characteristic of the application, such as hot and cold data distribution and an amount of data exchanged between nodes, a memory volume required by the target application, a memory tiering suggestion, and a node affinity suggestion.

In a possible implementation of the first aspect, the method further includes: The first network device establishes the first memory pool in a globally unified memory addressing manner.

In a possible implementation of the first aspect, the memory semantics includes remote direct memory access (RDMA) and/or data streaming assessment (DSA).

In a possible implementation of the first aspect, the memory resource includes a high bandwidth memory (HBM), a double data rate synchronous dynamic random memory (DDR), a phase change memory (PCM), and/or a solid state disk (SSD).

A second aspect of this application provides a data obtaining method. The method includes: A first network device sends data request information to a second network device, where a target application is run on the first network device, and the data request information is for requesting target data; the first network device receives target address information sent by the second network device, where the target address information includes an address of a memory resource that stores the target data and that is in a second memory pool; and the first network device obtains the target data from a first memory pool based on the target address information by using memory semantics, where the first memory pool indicates a memory resource that is allowed to be used by the target application.

In this application, different processes of the target application are run on a plurality of first network devices, and a management node compiles a memory resource in the first memory pool in a unified addressing manner. Data exchange or data sharing may be performed, by using memory semantics, between the first network devices that run the different processes in the first memory pool. Data exchange is performed between the first network device and another first network device in the first memory pool by using the memory semantics, to avoid a complex communication process, and greatly improve data exchange and data sharing efficiency.

In a possible implementation of the second aspect, the memory semantics include remote RDMA and/or DSA.

A third aspect of this application provides a network device. The network device includes at least one processor, a memory, and a communication interface. The processor is coupled to the memory and the communication interface. The memory is configured to store instructions. The processor is configured to execute the instructions. The communication interface is configured to communicate with another network device under control of the processor. When the instructions are executed by the processor, the network device is enabled to perform the method according to any one of the first aspect or the possible implementations of the first aspect, or the network device is enabled to perform the method according to any one of the second aspect or the possible implementations of the second aspect.

A fourth aspect of this application provides a computer-readable storage medium. The computer-readable storage medium stores a program, and the program enables a network device to perform the method according to any one of the first aspect or the possible implementations of the first aspect; or enables a network device to perform the method according to any one of the second aspect or the possible implementations of the second aspect.

A fifth aspect of this application provides a computer program product that stores one or more computer-executable instructions. When the computer-executable instructions are executed by the processor, the processor performs the method according to any one of the first aspect or the possible implementations of the first aspect; or the processor performs the method according to any one of the second aspect or the possible implementations of the second aspect.

A sixth aspect of this application provides a chip. The chip includes a processor and a communication interface. The processor is coupled to the communication interface. The processor is configured to read instructions to perform the method according to any one of the first aspect or the possible implementations of the first aspect; or perform the method according to any one of the second aspect or the possible implementations of the second aspect.

A seventh aspect of this application provides a memory expansion system. The system includes the network device according to any one of the first aspect or the possible implementations of the first aspect, and includes the network device according to any one of the second aspect or the possible implementations of the second aspect.

It can be learned from the foregoing technical solutions that embodiments of this application have the following advantages:

In this application, the first network device may generate the memory topology based on the memory requirement information of the target application and the usage of the memory resource in the first memory pool, and then establish the second memory pool in the first memory pool based on the memory topology, where the second memory pool indicates the memory resource that is allowed to be used by the target application. In this way, the first network device can appropriately allocate a memory to the target application based on the memory requirement information and the usage of the resource in the first memory pool, and dynamically adjust service load distribution between the memory pools, so that service load of the memory pools is appropriately distributed, waiting time for a cluster operation is reduced, and operation efficiency is improved.

BRIEF DESCRIPTION OF DRAWINGS

FIG. 2 is a schematic application diagram of a memory expansion method according to this application;

FIG. 3 is a schematic diagram of a memory topology according to this application;

FIG. 4 is another schematic application diagram of a memory expansion method according to this application;

DESCRIPTION OF EMBODIMENTS

Figure 1:
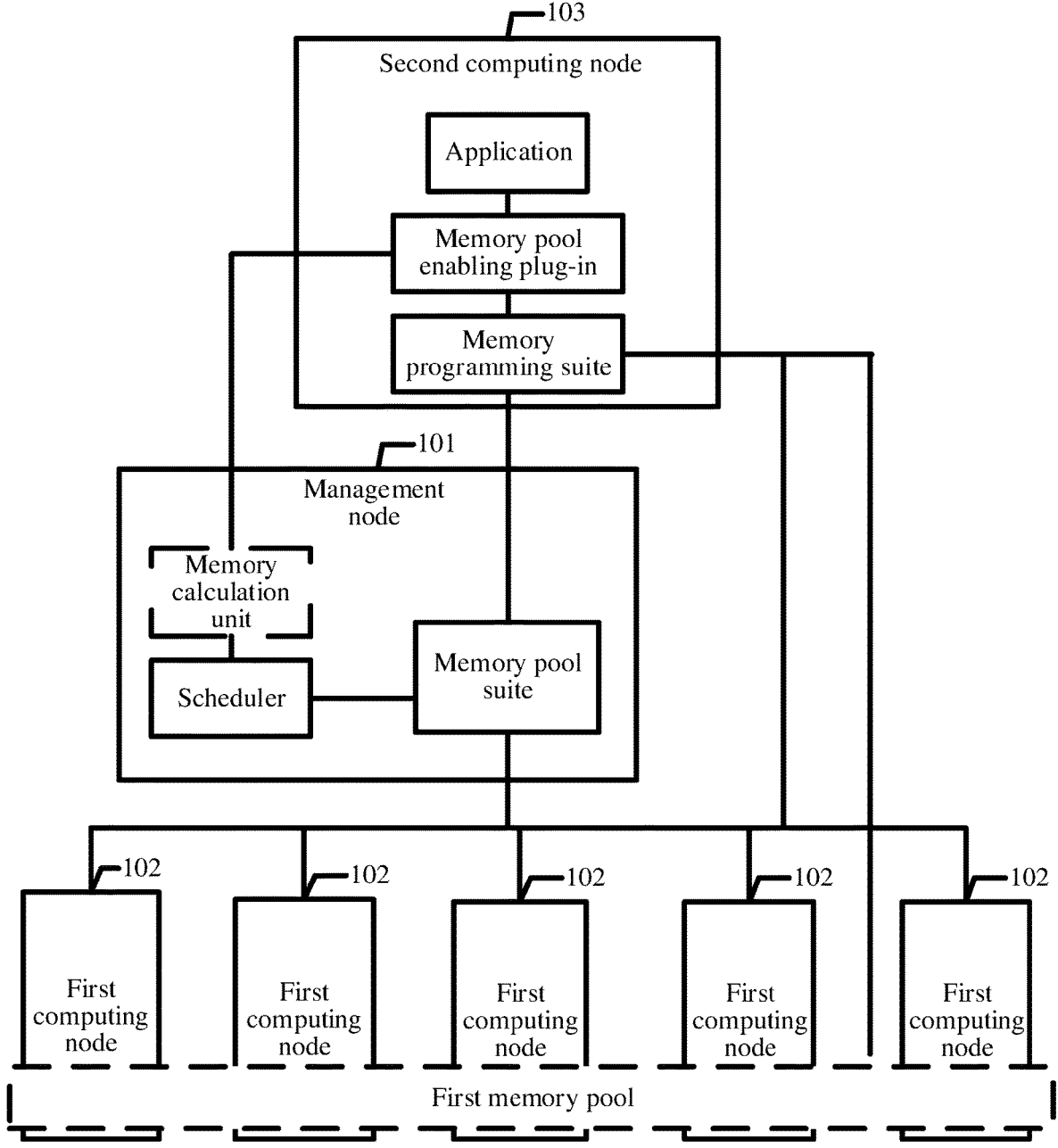
FIG. 1 is a schematic diagram of an application scenario of a memory expansion system according to this application.

The following describes embodiments of this application with reference to the accompanying drawings. A person of ordinary skill in the art may learn that, with development of technologies and emergence of new scenarios, the technical solutions provided in embodiments of this application are also applicable to similar technical problems.

In the specification, the claims, and the accompanying drawings of this application, the terms "first", "second", and the like are intended to distinguish between similar objects but do not necessarily indicate a specific order or sequence. It should be understood that data termed in such a way are interchangeable in appropriate circumstances so that embodiments of the present invention described herein can be implemented in other orders than the order illustrated or described herein.

The term "and/or" in this application describes only an association relationship of associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Currently, computing power pooling and storage pooling are widely used as major infrastructure-level technologies. To improve application performance, memory pooling has attracted attention in the industry. In a conventional memory pooling solution, generally, from an architecture perspective, when a network device determines, by using a plurality of means, that a local memory is insufficient or data sharing and exchange is required, the network device may access a remote memory, to implement global memory sharing and pooling.

In the conventional pooling solution, remote memory sharing and pooling is implemented from the architecture perspective, and the essence of the solution is to expand the local memory of the network device, so that an efficient and transparent global memory pool service can be implemented for a network device integrated with a standalone application. However, for a plurality of network devices integrated with an application, in the conventional pooling solution, a memory capacity of a local node is expanded from the architecture perspective. Consequently, a memory required by the application cannot be perceived, and a memory capacity expanded for a remote target device cannot be perceived either. For dynamic and large-scale distributed applications, such a limitation is even more distinct.

In the foregoing conventional pooling solution, a quantity of network devices occupied after partitioning and a memory capacity occupied after partitioning cannot be effectively determined. A case in which an operation and calculation cannot be supported due to an excessively small memory obtained by the network device often occurs, leading to long waiting time for a cluster operation and low cluster operation efficiency.

For the conventional pooling solution described in the foregoing method example, this application provides a memory expansion method, a memory expansion system, and a network device, to reduce waiting time for a cluster operation and improve cluster operation efficiency.

The following method example first describes the memory expansion system provided in this application.

FIG. 1 is a schematic diagram of an application scenario of a memory expansion system according to this application.

Refer to FIG. 1. The memory expansion system provided in this application includes a management node 101, a first computing node 102, and a second computing node 103. In the memory expansion system provided in this application, the management node 101 corresponds to the first network device mentioned in claims 1 to 9, the first computing node 102 corresponds to the network device mentioned in claims 1 to 9, and the second computing node runs the target application mentioned above and corresponds to the second network device mentioned in claims 5 to 9.

In this application, optionally, the memory expansion system may include one or more second computing nodes 103, and the plurality of second computing nodes 103 may form a second computing node cluster. FIG. 1 shows only one second computing node 103. The memory expansion system provided in this application may include more second computing nodes 103. This is not specifically limited herein.

In this application, the second computing node 103 is a computing device on a user side, for example, a server or a desktop computer. From a hardware perspective, a processor and a memory (not shown in FIG. 1) are disposed in the second computing node 103. From a software perspective, an application is run on the second computing node 103. The application is a general name of various applications presented to a user. For example, a type of the application may be a distributed application, or may be another type of application. This is not specifically limited herein. A memory enabling plug-in and a memory programming suite are run on the second computing node, and the application communicates with the management node and the first computing node 102 by using the memory enabling plug-in and the memory programming suite.

In this application, the memory expansion system may include one or more first computing nodes 101. The plurality of first computing nodes 101 may form a first computing node cluster, and the first computing nodes 101 may be interconnected. The first computing node 101 may be a server, a desktop computer, a controller of a storage array, a disk enclosure, or the like.

In terms of functions, the first computing node 102 is mainly configured to perform calculation, processing, or the like on data. In terms of hardware, the first computing node 102 includes at least a processor, a memory, and a control unit. The processor is a central processing unit (CPU), and is configured to process data from the outside of the first computing node or data generated inside the first computing node 102. The memory is an apparatus for storing data, and may be a memory or a hard disk. The memory is an internal memory that directly exchanges data with the processor. The data can be read and written in the memory at a high speed at any time, and the memory serves as a temporary data memory of an operating system or another running program. There are at least two types of memories. For example, the memory may be a random access memory or a read-only memory (ROM). For example, the random access memory may be a dynamic random access memory (DRAM) or a storage class memory (SCM). The DRAM is a semiconductor memory, and is a volatile memory (volatile memory) device like most random access memories (RAMs). The SCM uses a composite storage technology that combines both a conventional storage apparatus feature and a memory feature. The storage class memory can provide a higher read/write speed than the hard disk, but is slower than the DRAM in terms of an access speed and cheaper than the DRAM in terms of costs.

In this application, the management node 101 is usually configured to establish and manage a memory pool, and the management node 101 may communicate with any first computing node 102. Optionally, the management node 101 and a first computing node 102 may be a same device, and a node may be selected from the first computing nodes 102 to perform a function of the management node. The management node 101 is a device in a storage cluster. Optionally, the management node 101 may be an independent device independent of the first computing node 102. This is not specifically limited herein. From a software perspective, the management node 101 includes a distributed scheduler and a memory pool suite. The distributed scheduler may allocate a memory to the second computing node, and the memory pooling suite may implement memory pool construction and memory resource management in the memory pool. Optionally, the management node 101 may further include a memory computing unit, and the memory computing unit is used to calculate a size of a memory required when the second computing node 103 runs the target application.

The foregoing example describes a structure of the memory expansion system provided in this application. For the following example, refer to the memory expansion system described in the foregoing example. The memory expansion method provided in this application is described in detail by using an example in which the first network device is the management node, the network device is the first computing node, and the target application is run on the second computing node (the second network device).

FIG. 2 is a schematic application diagram of a memory expansion method according to this application.

As shown in FIG. 2, the memory expansion method provided in this application includes at least step 201 and step 202.

201: A first network device generates a memory topology based on memory requirement information of a target application and usage of a memory resource in a first memory pool.

In this application, the first memory pool is a logical memory that includes memory resources provided by a plurality of network devices. That is, the first memory pool is a logical memory established by a management node on the plurality of first computing nodes. For example, using FIG. 1 as an example, a memory pool established on five first computing nodes in FIG. 1 may be understood as the first memory pool.

In this application, the memory topology indicates capacities of different types of memory resources in one or more network devices that need to be occupied by the target application. Optionally, the memory topology may include a quantity of network devices, the memory topology may include a type of the memory resource, the memory topology may include a capacity of the memory resource, and the memory topology may further include another parameter. This is not specifically limited herein.

FIG. 3 is a schematic diagram of a memory topology according to this application.

For example, it is assumed that the management node receives the memory requirement information of the target application run on the second computing node, and generates an optimal memory topology of the application based on multi-dimensional metric values such as resource usage in the first memory pool. Information included in a typical memory topology is shown in FIG. 3. The memory topology in FIG. 3 indicates that the second computing node needs three nodes to provide memory resources, and a node 1 needs to provide a 200 GB DDR memory, a 500 GB PCM memory, and a 1 TB SSD memory. Similarly, a node 2 needs to provide a 250 GB DDR memory, an 800 GB PCM memory, and a 500 GB SSD memory. A node 3 needs to provide a 5 GB DDR memory, a 500 GB PCM memory, and an 800 GB SSD memory.

In this application, a scheduler in the management node may complete computing power and memory allocation for the second computing node in the first memory pool based on the memory requirement information and the usage of the memory resource in the first memory pool and according to a scheduling policy. Different from a conventional scheduler, when allocating a resource, the scheduler in this application considers appropriate memory use, for example, ensures appropriate use of a memory at each layer of each first computing node, and after another high-priority policy is met, uses a Max-Min scheduling method as much as possible. In this way, a memory resource is preferentially allocated to the second computing node with a high memory capacity requirement as much as possible, to avoid a memory fragment.

For example, a Spark cluster is used as an example to describe a construction process of a memory topology. For example, it is assumed that a plurality of second computing nodes form a Spark cluster in a big data environment, and a Spark in memory shuffle plug-in is constructed in the cluster, so that data can be calculated in a memory and data can be exchanged across nodes. After obtaining a memory requirement of each second computing node, the management node may allocate a memory topology to the second computing node based on the Max-Min scheduling algorithm by using an intelligent scheduler Yarn or a third-party scheduler.

202: The first network device establishes a second memory pool in the first memory pool based on the memory topology.

In this application, the second memory pool indicates a memory resource that is allowed to be used by the target application. Optionally, when a local memory resource of the network device is insufficient, when the network device needs to exchange data with another network device, and the network device shares data with another network device, or in a plurality of other cases, the memory resource in the second memory resource pool may be used to assist in running the target application.

Optionally, the second memory pool includes a high-performance memory segment, a low-performance memory segment, a persistence capability segment, and/or a non-persistence capability segment.

In this application, the management node may divide global memory space into different memory segments, for example, the high-performance memory segment, the persistence capability segment, and the non-persistence capability segment, based on attributes of different media included in the memory pool, for example, a performance difference and whether there is a persistence capability. When addresses in these address segments are subsequently written, the addresses are written into corresponding media synchronously or asynchronously. In this possible implementation, the management node may store different data separately based on a plurality of factors such as use frequency and storage duration, so that the first network device completes an operation more efficiently.

Optionally, the first memory pool and the second memory pool described in the foregoing example may be distributed memory pools (DMLs), and the distributed memory pool refers to a logical memory that is formed by cross-node memories by using a high-speed network, that is physically distributed on nodes, and that can provide a global access function in a logic sense. Alternatively, the first memory pool and the second memory pool described in the foregoing example may be other types of memory pools. This is not specifically limited herein.

In this application, the first network device may generate the memory topology based on the memory requirement information of the target application and the usage of the memory resource in the first memory pool, and then establish the second memory pool in the first memory pool based on the memory topology, where the second memory pool indicates the memory resource that is allowed to be used by the target application. In this way, the first network device can appropriately allocate a memory to the target application based on the memory requirement information and the usage of the resource in the first memory pool, and dynamically adjust service load distribution between the memory pools, so that service load of the memory pools is appropriately distributed, waiting time for a cluster operation is reduced, and operation efficiency is improved.

According to the memory expansion method provided in this application, from a macro perspective and based on a core idea of application driving, a problem of how to evenly allocate a memory for an application in a cluster is resolved, a problem that the application cannot obtain a sufficient memory in the cluster to complete in-memory data processing is resolved, and a problem of low operation efficiency and a low cluster operation throughput of a data-intensive application in the cluster is resolved. Application-driven global memory pooling improves application performance, further optimizes global memory allocation, and improves cluster operation efficiency.

In this application, step 201 and step 202 in the foregoing method example describe the memory expansion method provided in this application. In step 202 in the foregoing method example, there is a specific implementation in which the first network device establishes the second memory pool in the first memory pool based on the memory topology. This specific implementation is described in the following method example.

FIG. 4 is another schematic application diagram of a memory expansion method according to this application.

301: A first network device searches, based on a memory topology, a first memory pool for a memory resource that matches the memory topology.

In this application, a Spark cluster is used as an example for description. For a single computing device, assuming that a memory topology obtained for a target application run on the computing device indicates that a 1.5 T memory is required, if each first computing node may have a 0.3 T memory for pooling, a management node finds five nodes from the first memory pool to provide memory resources for the target application. This process is a process of finding the memory resource that matches the memory topology.

Optionally, the memory resource may include an HBM, the memory resource may include a DDR, the memory resource may include a phase change memory PCM, or the memory resource may include another type of memory resource such as a solid state disk SSD. This is not specifically limited herein.

302: The first network device establishes a second memory pool based on the memory resource that matches the memory topology.

In this application, after the management node finds the matching memory resource based on memory topology information of the application, a scheduler included in the management node may dynamically establish the second memory pool by invoking a memory pool suite.

In this application, when the management node establishes the second memory pool, each first computing node selected based on the memory topology information contributes a part of the memory resources. Optionally, the part of the memory resources contributed by the first computing node may be a high bandwidth memory (HBM), the part of the memory resources contributed by the first computing node may be a DDR, the part of the memory resources contributed by the first computing node may be a PCM, or the part of the memory resources contributed by the first computing node may be a plurality of media such as an SSD. This is not specifically limited herein.

The management node organizes all memory resources contributed by each first computing node into one global memory space (the second memory pool). In a first computing node, the management node may organize different media on the first computing node into a multi-layered memory structure, and the multi-layered memory structure becomes a part of the global memory space. In addition, the management node may divide the global memory space into different memory segments, for example, a high-performance memory segment, a persistence capability segment, and a non-persistence capability segment, based on attributes of different media included in the memory pool, for example, a performance difference and whether there is a persistence capability. When addresses in these address segments are subsequently written, the addresses are written into corresponding media synchronously or asynchronously.

For example, using the Spark cluster as an example, it is assumed that the management node finds, from the first memory pool, five nodes providing memory resources that match the memory topology. The management node may dynamically combine the five nodes into a cluster by using the scheduler, and pool, by using a memory pooling suite, memory resources provided by the five nodes, to obtain the second memory pool. After data of the second computing node is shuffled in the second memory pool, and obtained data is flushed to disks, the five nodes are quickly released, to provide a memory resource for another application.

In this application, after the management node establishes the second memory pool, all second memory pools are uniformly managed by the memory pool suite, and the second memory pool has globally unified memory addressing and unified access capabilities. The second memory pool provides a northbound interface, and implements functions such as global memory application, read/write access, release, and cross-node memory access based on protocols such as RDMA and iWARP.

In this application, when the memory pool suite included in the management node manages the second memory pool, the second memory pool includes different types of media, such as the HBM, the DRAM, the PCM, and the SSD mentioned above. Based on the foregoing second memory pool, an upper-layer user may allocate a memory according to a specific rule, for example, specify an attribute, a performance level, and whether to be persistent, or specify that allocation is performed on a node based on a specified length. During memory allocation, a system applies for a memory space and updates statistics on corresponding nodes according to the specified rule. After a memory space is applied for on all nodes on which memory space application is performed, the system returns a global ID to the upper-layer user. The ID includes management information about addresses, such as a memory partition, a unique index, performance, a persistence attribute, and other content.

In this application, in a memory allocation process, the management node may further implement simultaneous allocation on a plurality of nodes, and combine the memory space that conforms to the specified rule. Optionally, a plurality of addresses may be allocated across nodes and connected together to form a linear memory space. A memory space may be organized according to a copy rule, or a memory space may be organized in another manner. In these memory spaces, a global ID is returned to the upper-layer user in the manner described in the previous paragraph.

In this application, when the upper-layer user stops using a global memory segment, the management node releases a memory space of the segment for the first memory pool, and marks the space as available. In addition, the management node notifies, based on an actual distribution status of the corresponding memory space, each related computing node to release the memory space that is previously applied for, and update information such as a capacity.

In this application, when performing the memory expansion method, in addition to performing step 201 and step 202 described in the foregoing example, optionally, the management node may further return target address information based on data request information sent by a second network device. This process is described in detail in the following example.

In this application, it is assumed that the second network device is the second computing node in the system shown in FIG. 1, different processes of the target application are run on a plurality of second computing nodes, and the management node compiles a memory resource in the second memory pool in a unified addressing manner. Data exchange or data sharing may be performed, by using memory semantics, between the second computing nodes that run the different processes in the second memory pool.

Figures 5, 6:
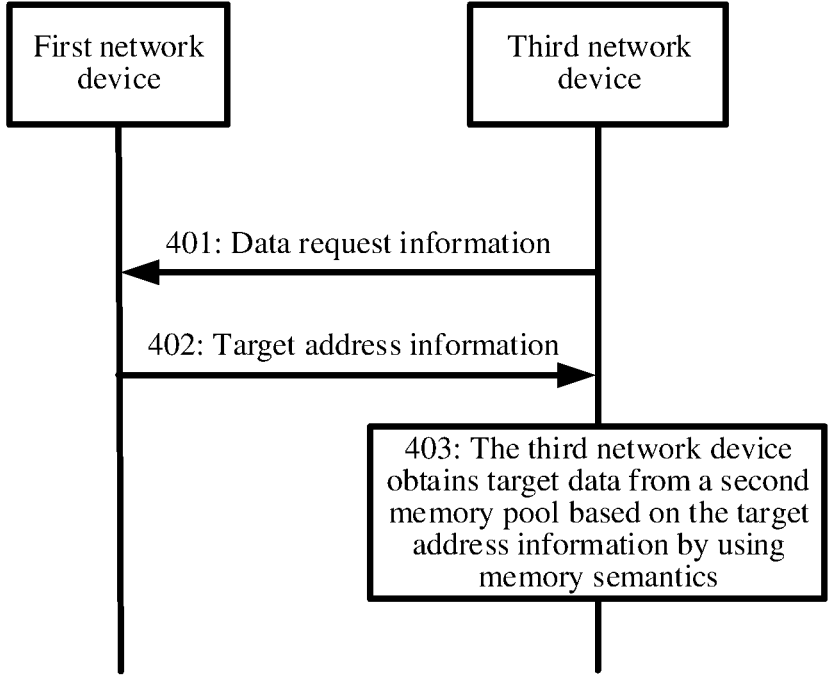
FIG. 5 is another schematic application diagram of a memory expansion method according to this application.
FIG. 6 is a schematic diagram of memory requirement information according to this application.

FIG. 5 is another schematic application diagram of a memory expansion method according to this application.

401: A first network device receives data request information sent by a second network device.

For example, when a process A run on a second computing node A completes calculation, the second computing node A may place, in a global memory pool (a second memory pool), data A that needs to be exchanged, and publish a globally unified addressed address to a KV server on a management node. If a process B of a target application is run on a computing node B, the computing node B needs to use the data A. The computing node B sends data request information to the management node, where the data request information indicates that the computing node B needs to obtain the data A.

402: The first network device sends target address information to the second network device based on the data request information.

For example, after the computing node B sends the data request information to the management node, the management node may send the target address information to the computing node in a plurality of manners (for example, by using the KV server) based on the data request information. The target address information includes an address of a memory resource that stores target data and that is in the second memory pool.

403: The second network device obtains the target data from the second memory pool based on the target address information by using memory semantics.

For example, after the computing node B sends the data request information to the management node, and the management node sends the target address information to the computing node by using the KV server based on the data request information, that is, after the computing node B obtains a global uniform address (the target address information) of the data A by accessing the KV server on the management node, the computing node B may directly read the data A from the global memory pool (the second memory pool) based on the RDMA protocol or the DSA protocol.

In this application, in a conventional data exchange or data sharing process, when required calculation cannot be completed for data in a large-scale data-intensive application in a memory due to an insufficient memory capacity, a system swaps the data to a local storage medium or a remote device. However, in a next processing phase, data needs to be read back from the storage medium or the remote device, and data exchange is implemented through socket communication, and processing continues. Such repeated I/O processing severely affects an operation completion time and affects overall system performance.

For example, if data exchange or data sharing needs to be performed between the second computing node A and the second computing node B, for example, the data A needs to be exchanged, socket ports between the second computing node A and the second computing node B need to communicate with each other to exchange the data A. The communication process includes a lengthy data serialization and data deserialization process, and the second computing node A and the second computing node B need to perform disk I/O operations. The conventional data exchange or data sharing process is expensive and time-consuming. However, in a process of data exchange or data sharing between computing nodes provided in this application, the second computing node A and the second computing node B may exchange the data A by using the memory semantics, to avoid a complex communication process, and greatly improve data exchange and data sharing efficiency.

Optionally, the memory semantics may be the RDMA protocol, the memory semantics may be the DSA protocol, or the memory semantics may be another type of protocol. This is not specifically limited herein.

In this application, when performing the memory expansion method, in addition to performing step 201 and step 202 described in the foregoing example, optionally, the management node may further generate memory requirement information based on related information of the target application. A specific generation manner is described in the following example.

In this application, optionally, the related information of the target application may include a type of the target application, an amount of input data of the target application, a memory expansion coefficient of the target application, and/or an access characteristic of the target application (such as hot and cold data distribution and an amount of data exchanged between nodes). The related information of the target application may further include other information. This is not specifically limited herein.

In this application, optionally, the memory requirement information of the target application indicates some information related to a memory required by the target application. Optionally, the memory requirement information may include an absolute memory usage, a memory tiering configuration, and/or a node affinity configuration, and the memory requirement information may further include another parameter. This is not specifically limited herein.

FIG. 6 is a schematic diagram of memory requirement information according to this application.

In this application, optionally, the management node may include a memory computing unit. When the target application on the second computing node is started, the management node may evaluate the memory requirement information of the target application based on the related information of the target application by using the memory computing unit. The memory computing unit is application-aware, and the memory computing unit may obtain the related information of the target application in a plurality of manners, such as a program built-in manner, a user input manner, or a self-learning manner. After the memory computing unit obtains the related information of the target application, the memory computing unit may calculate, based on the type of the application, the amount of input data, the memory expansion coefficient of the application, and the memory access characteristic of the application, such as the hot and cold data distribution and the amount of data exchanged between nodes, a memory volume required by the target application, a memory tiering suggestion, and a node affinity suggestion. Typical application memory requirement information is shown in FIG. 6. The management node may generate a memory topology based on the memory requirement information shown in FIG. 6.

In this application, the management node obtains the memory requirement information in a plurality of manners. Optionally, the memory computing unit included in the management node may generate the memory requirement information based on the related information of the target application. Optionally, another node may generate the memory requirement information based on the related information of the target application, and then send the memory requirement information to the management node. Optionally, the management node may obtain the memory requirement information in another manner. This is not specifically limited herein.

In this application, the foregoing example describes a process in which the management node generates the memory requirement information. When performing the memory expansion method, in addition to performing the steps described in the foregoing example, optionally, the management node may further establish a first memory pool. A specific establishment manner is described in the following example.

In this application, a memory in the first memory pool is compiled in a globally unified hybrid memory addressing manner, and the management node may centrally manage different types of media (such as an HBM, a DDR, a PCM, and an SSD) by using a memory pooling suite. The management node can also provide unified addressing and access to memories across nodes by using the memory pooling suite.

In this application, the first network device may generate the memory topology based on the memory requirement information of the target application and the usage of the memory resource in the first memory pool, and then establish the second memory pool in the first memory pool based on the memory topology, where the second memory pool indicates the memory resource that is allowed to be used by the target application. In this way, the first network device can appropriately allocate a memory to the target application based on the memory requirement information and the usage of the resource in the first memory pool, and dynamically adjust service load distribution between the memory pools, so that service load of the memory pools is appropriately distributed, waiting time for a cluster operation is reduced, and operation efficiency is improved.

Figure 7:
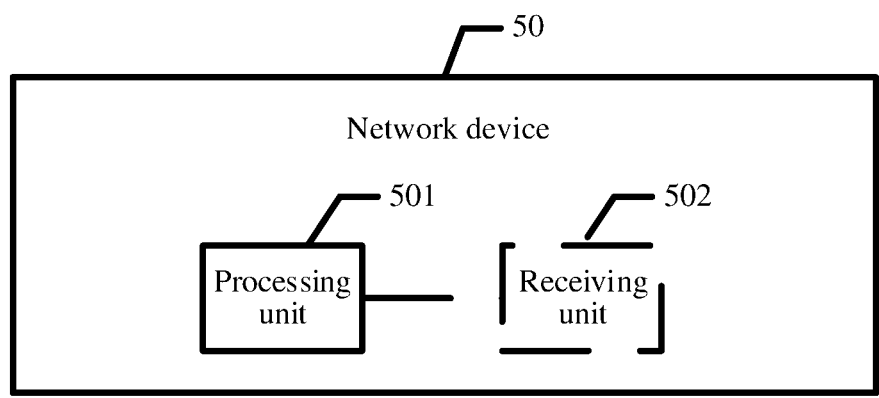
FIG. 7 is a schematic structural diagram of a network device according to this application.

The foregoing examples provide different implementations of the memory expansion method. The following provides a network device 50. As shown in FIG. 7, the network device 50 is configured to perform the steps performed by the first network device (the management node) in the foregoing examples. For specific understanding of the performed steps and corresponding beneficial effects, refer to the foregoing corresponding examples. Details are not described herein again. The network device 50 includes:

a processing unit 501, configured to:

generate a memory topology based on memory requirement information of a target application and usage of a memory resource in a first memory pool, where the first memory pool is a logical memory including memory resources provided by a plurality of network devices, and the memory topology indicates capacities of different types of memory resources in one or more network devices that need to be occupied by the target application; and establish a second memory pool in the first memory pool based on the memory topology, where the second memory pool indicates a memory resource that is allowed to be used by the target application.

In a possible implementation, the processing unit 501 is configured to:

determine, from the first memory pool based on the memory topology, a memory resource that matches the memory topology; and establish the second memory pool based on the memory resource that matches the memory topology.

In a possible implementation, the memory topology includes a quantity of network devices, a type of the memory resource, and a capacity of the memory resource.

In a possible implementation, the second memory pool includes a high-performance memory segment, a low-performance memory segment, a persistence capability segment, and/or a non-persistence capability segment.

In a possible implementation, the network device further includes a receiving unit 502.

The receiving unit 502 is further configured to receive data request information sent by a second network device, where the target application is run on the second network device, and the data request information is for requesting target data.

The processing unit 501 is further configured to send target address information to the second network device based on the data request information, where the target address information includes an address of a memory resource that stores the target data and that is in the second memory pool, and the target address information indicates the second network device to obtain the target data from the second memory pool by using memory semantics.

In a possible implementation, the processing unit 501 is further configured to generate the memory requirement information based on related information of the target application, where the related information of the target application includes a type of the target application, a memory expansion coefficient of the target application, an access characteristic of the target application, and/or an amount of input data of the target application, and the memory requirement information includes computing power, absolute memory usage, a memory tiering configuration, and/or a node affinity configuration of the target application.

In a possible implementation, the processing unit 501 is further configured to establish the first memory pool in a globally unified memory addressing manner.

In a possible implementation, the memory semantics includes remote direct memory access RDMA and/or DSA.

In a possible implementation, the memory resource includes a high bandwidth memory HBM, a double data rate synchronous dynamic random access memory DDR, a phase change memory PCM, and/or a solid state disk SSD.

It should be noted that content such as information exchange and an execution process between the modules of the network device 50 are based on a same concept as the method examples in this application, and performed steps are consistent with detailed content of the foregoing method steps. For details, refer to descriptions in the foregoing method examples.

The foregoing example provides the network device 50, and the following provides a network device 60. As shown in FIG. 7, the network device 60 is configured to perform the steps performed by the second network device (the second computing node) in the foregoing examples. For specific understanding of the performed steps and corresponding beneficial effects, refer to the foregoing corresponding examples. Details are not described herein again. The network device 50 includes:

a sending unit 601, configured to send data request information to a second network device, where a target application is run on the first network device, and the data request information is for requesting target data; and a receiving unit 602, configured to receive target address information sent by the second network device, where the target address information includes an address of a memory resource that stores the target data and that is in a second memory pool; and a processing unit 603, configured to obtain the target data from a first memory pool based on the target address information by using memory semantics, where the first memory pool indicates a memory resource that is allowed to be used by the target application.

In a possible implementation, the memory semantics includes remote direct memory access RDMA and/or DSA.

It should be noted that content such as information exchange and an execution process between the modules of the network device 60 are based on a same concept as the method examples in this application, and performed steps are consistent with detailed content of the foregoing method steps. For details, refer to descriptions in the foregoing method examples.

Figure 8:
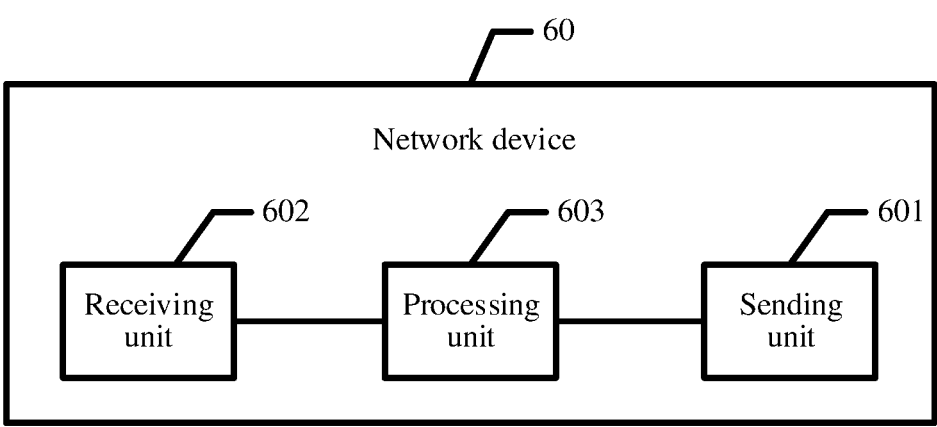
FIG. 8 is another schematic structural diagram of a network device according to this application.
Figure 9:
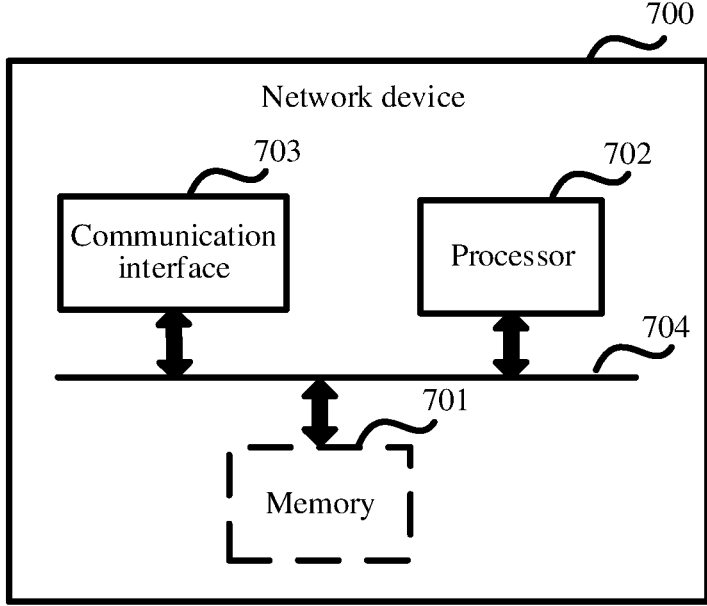
FIG. 9 is another schematic structural diagram of a network device according to this application.

FIG. 9 is a schematic structural diagram of a network device 700 according to this application. The network device 700 includes a processor 702, a communication interface 703, and a memory 701. Optionally, a bus 704 may be included. The communication interface 703, the processor 702, and the memory 701 may be connected to each other through the bus 704. The bus 704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus. The network device 700 may implement a function of the network device 50 in the example shown in FIG. 7, or implement a function of the network device 60 in FIG. 8. The processor 702 and the communication interface 703 may perform corresponding operations of the network device in the foregoing method examples.

The components of the network device are described in detail below with reference to FIG. 9.

The memory 701 may be a volatile memory, such as a random access memory (RAM); or a non-volatile memory, such as a read-only memory (ROM), a flash memory, a hard disk drive (HDD), or a solid-state drive (SSD); or a combination of the foregoing types of memories, configured to store program code, a configuration file, or other content for implementing the method in this application.

The processor 702 is a control center of a controller, and may be a central processing unit (CPU), or may be an application-specific integrated circuit (ASIC), or one or more integrated circuits configured to implement the examples provided in this application, for example, one or more digital signal processors (DSPs), or one or more field programmable gate arrays (FPGAs).

The communication interface 703 is configured to communicate with another device.

The processor 702 may perform the operation performed by the network device 50 in the example shown in FIG. 7, or perform the operation performed by the network device 60 in FIG. 8. Details are not described herein again.

It should be noted that content such as information exchange and an execution process between the modules of the network device 700 are based on a same concept as the method examples in this application, and performed steps are consistent with detailed content of the foregoing method steps. For details, refer to descriptions in the foregoing method examples.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A memory expansion method performed by a first network device, comprising:

generating a memory topology based on memory requirement information of a target application and usage of a memory resource in a first memory pool, wherein the first memory pool is a logical memory comprising memory resources provided by a plurality of network devices, and the memory topology indicates capacities of different types of memory resources in the network devices that are to be occupied by the target application, wherein the different types of memory resources have different levels of performance, and the first memory pool forms a hierarchical memory pool according to the different types of memory resources, and wherein the memory topology includes a quantity of network devices that provide memory resource to be used by the target application, a type of the provided memory resource to be used by the target application, and a capacity of the provided memory resource to be used by the target application;

generating the memory requirement information based on related information of the target application, wherein the related information of the target application includes a type of the target application, an access characteristic of the target application, or an amount of input data of the target application, and the memory requirement information includes computing power, absolute memory usage, and a memory tiering configuration; and establishing a second memory pool in the first memory pool based on the memory topology, wherein the second memory pool is a global memory space and is being divided into different memory segments, wherein the different memory segments have different performances, wherein the second memory pool includes hierarchical memory resources from the hierarchical memory pool, and wherein the second memory pool comprises a memory resource that is allowed to be used by the target application.

2. The memory expansion method according to claim 1, wherein the step of establishing the second memory pool comprises:

determining, from the first memory pool based on the memory topology, a memory resource that matches the memory topology; and establishing the second memory pool based on the memory resource that matches the memory topology.

3. The memory expansion method according to claim 1, wherein the second memory pool comprises a high-performance memory segment, a low-performance memory segment, a persistence capability segment, and a non-persistence capability segment.

4. The memory expansion method according to claim 1, further comprising:

receiving data request information sent by a second network device running the target application, wherein the data request information is for requesting target data; and sending target address information to the second network device based on the data request information, wherein the target address information comprises an address of a memory resource in the second memory pool and storing the target data, and the target address information indicates to the second network device to obtain the target data from the second memory pool by using memory semantics.

5. The memory expansion method according to claim 1, further comprising:

establishing the first memory pool in a globally unified memory addressing manner.

6. The memory expansion method according to claim 1, wherein the memory semantics comprises remote direct memory access (RDMA) or data streaming assessment (DSA).

7. The memory expansion method according to claim 1, wherein the memory resource comprises a high bandwidth memory (HBM), a double data rate synchronous dynamic random access memory (DDR), a phase change memory (PCM), or solid state disk (SSD).

8. A network device comprising:

a memory storing executable instructions; and a processor configured to execute the executable instructions to:

generate a memory topology based on memory requirement information of a target application and usage of a memory resource in a first memory pool, wherein the first memory pool is a logical memory comprising memory resources provided by a plurality of network devices, and the memory topology indicates capacities of different types of memory resources in the network devices that need to be occupied by the target application, wherein the different types of memory resources have different levels of performance, and the first memory pool forms a hierarchical memory pool according to the different types of memory resources, and wherein the memory topology includes a quantity of network devices that provide memory resource to be used by the target application, a type of the provided memory resource to be used by the target application, and a capacity of the provided memory resource to be used by the target application;

generate the memory requirement information based on related information of the target application, wherein the related information of the target application includes a type of the target application, an access characteristic of the target application, or an amount of input data of the target application, and the memory requirement information includes computing power, absolute memory usage, and a memory tiering configuration; and establish a second memory pool in the first memory pool based on the memory topology, wherein the second memory pool comprise hierarchical memory resources from the hierarchical memory pool, wherein the second memory pool comprises a memory resource that is allowed to be used by the target application, wherein the second memory pool is a global memory space and is being divided into different memory segments, and wherein the different memory segments have different performances.

9. The network device according to claim 8, wherein the processor is configured to establish the second memory pool by:

determining, from the first memory pool based on the memory topology, a memory resource that matches the memory topology; and establishing the second memory pool based on the memory resource that matches the memory topology.

10. The network device according to claim 8, wherein the second memory pool comprises a high-performance memory segment, a low-performance memory segment, a persistence capability segment, and a non-persistence capability segment.

11. The network device according to claim 8, wherein the processor is further configured to:

receive data request information sent by a second network device running the target application, wherein the data request information is for requesting target data; and send target address information to the second network device based on the data request information, wherein the target address information comprises an address of a memory resource in the second memory pool that stores the target data, and the target address information indicates to the second network device to obtain the target data from the second memory pool by using memory semantics.

12. The network device according to claim 8, wherein the processor is further configured to establish the first memory pool in a globally unified memory addressing manner.

13. The network device according to claim 8, wherein the memory semantics comprises remote direct memory access (RDMA) or data streaming assessment (DSA).

14. The network device according to claim 8, wherein the memory resource comprises a high bandwidth memory (HBM), a double data rate synchronous dynamic random access memory (DDR), a phase change memory (PCM), or a solid state disk (SSD).

* * * * *